United States Patent

Hettinger

[11] Patent Number: 5,896,884
[45] Date of Patent: Apr. 27, 1999

[54] MODULAR VALVE STRUCTURE

[75] Inventor: Gerhard Hettinger, Ingelfingen, Germany

[73] Assignee: Burkert Werke GmbH & Co., Ingelfingen, Germany

[21] Appl. No.: 08/776,009
[22] PCT Filed: May 17, 1996
[86] PCT No.: PCT/EP96/02140
§ 371 Date: Jan. 16, 1997
§ 102(e) Date: Jan. 16, 1997
[87] PCT Pub. No.: WO96/36829
PCT Pub. Date: Nov. 21, 1996

[30] Foreign Application Priority Data

May 19, 1995 [DE] Germany ............... 295 08 401 U

[51] Int. Cl.[6] .................................. F16K 31/00
[52] U.S. Cl. ..................... 137/269; 251/366; 251/367
[58] Field of Search .................. 251/366, 367; 137/269

[56] References Cited

U.S. PATENT DOCUMENTS 5,337,785 8/1994 Römer.

FOREIGN PATENT DOCUMENTS

| 0578168 | 1/1994 | European Pat. Off. |
|---|---|---|
| 1304738 | 8/1961 | France ............... 251/367 |
| 1450561 | 3/1969 | Germany. |
| 2311865 | 10/1973 | Germany ............... 251/366 |

Primary Examiner—A. Michael Chambers
Attorney, Agent, or Firm—Sixbey, Friedman, Leedom & Ferguson, P.C.; Gerald J. Ferguson, Jr.

[57] ABSTRACT

A modular valve structure comprising a fluid conducting valve part and a drive part is characterized in that the fluid conducting valve part comprises a main body (10) with an inlet (10a) and an outlet (10b) and furthermore a uniform connection interface (12), at which both an inlet duct (10a') extending from the inlet (10a) and also an outlet duct (10b') leading to the outlet (10b) and separated from the inlet (10a) by a rib (24) terminate, and in that one of several valve components (36, 50, 709 76, 76'), which are different but however possess a corresponding, uniformly designed connection side (120), may be freely selectively connected with the connection interface (12).

9 Claims, 6 Drawing Sheets

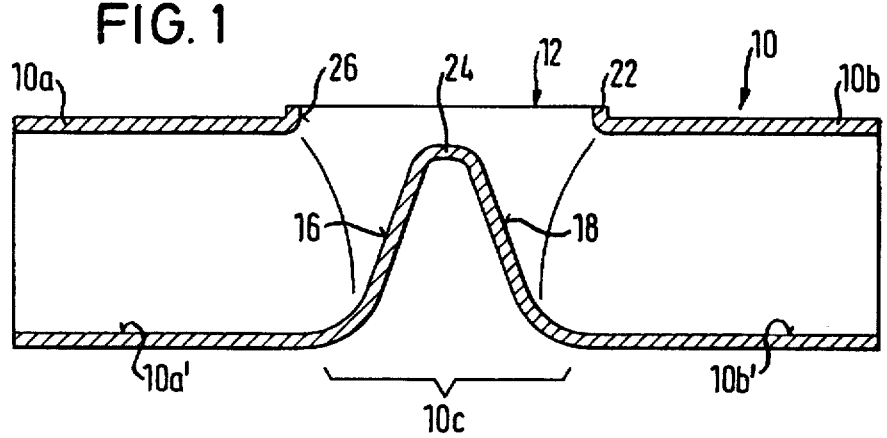
FIG. 1
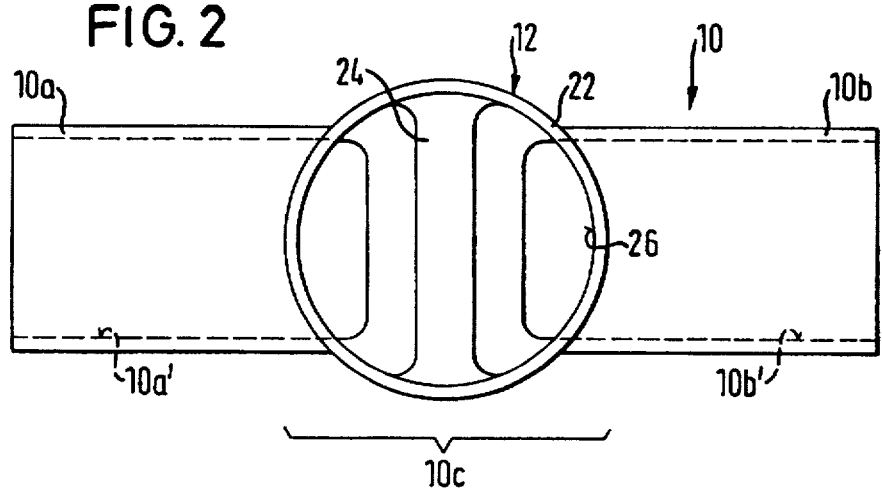
FIG. 2
FIG. 3
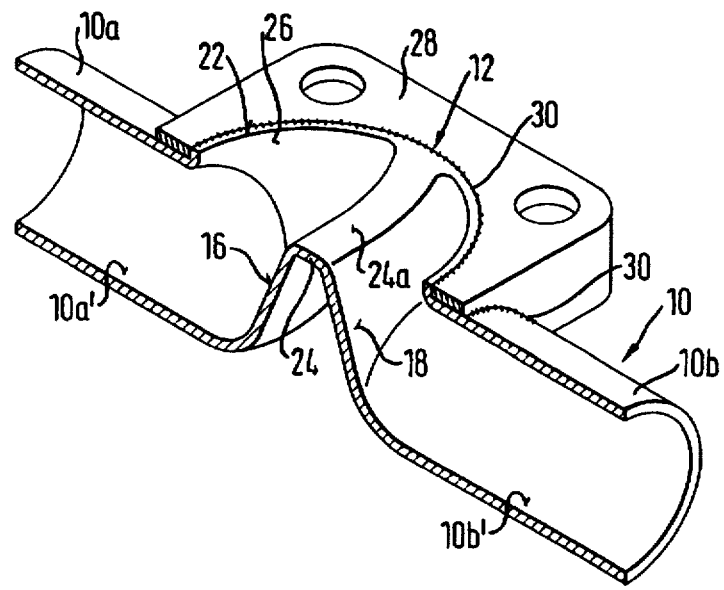

MODULAR VALVE STRUCTURE

The invention relates to a modular valve structure with a fluid conducting valve part and a drive part.

Conventional valves comprising a drive part and a valve body have inter alia the disadvantage that for different applications specific valves are necessary and correspondingly a multiplicity of different components is to be made available. As a result this leads to high costs for manufacture and warehousing of parts. Furthermore, the servicing of such valves is relatively involved and complicated. A further problem is involved by any later installation of sensors, which for example are employed for feedback of an actual quantity for a controlled system or the like. For such installation it is as a rule necessary for the entire valve to be removed, something which more particularly in the case of welded valve connections leads to a substantial expenditure of money and time. Furthermore the handling and servicing of sensor systems is relatively involved. Similar problems occur in connection with metering or discharge devices to be provided. A further disadvantageous feature is that generally a relatively large amount of force is necessary in order to close the respective valve against the force of the flowing medium.

The object of the invention is to create a modular valve structure of the type initially mentioned, which can be made up of a few component elements and accordingly can be adapted to different requirements without any problems, there simultaneously being the guarantee of the simplest possible and problem-free servicing.

The aim of the invention is to be attained because the fluid conducting valve part comprises a main body with an inlet and an outlet and furthermore a uniform connection interface, at which both an inlet duct extending from the inlet and also an outlet duct leading to the outlet and separated from the inlet by a rib terminate, and because one of several valve components, which are different but however possess a corresponding, uniformly designed connection side, may be freely selectively connected at the connection interface. In this respect the connection sides of the different valve components preferably respectively have at least one uniformly designed connection opening.

Owing to this design the respective valve can be assembled in a simple manner from a minimum number of standardized modules for the creation of a system which is adapted to the respective application in the best possible manner. Servicing is more especially simplified because it is now possible for wear-prone parts to be replaced without it being necessary for the main body of the fluid conducting valve part having to be disconnected from the respective pipe system for this purpose, something representing a particular advantage especially in the case of welded connections. Furthermore, later changes, including changes of the type of drive are possible without any problems.

In a preferred embodiment of the valve structure in accordance with the invention the different valve components include directly operated valve elements, which sealingly cooperate with the rim of an opening constituting the connection interface and with the rib, fluid conducting control housing bodies, in which a valve chamber is formed with a sealing seat, intermediate housings for receiving sensors and intermediate housings for duct branching, the taking of samples, the inlet of materials or for metering Accordingly, using only a few standardized modules a large number of possibilities of variation are provided for the valve structure. Owing to the employment of a standardized fluid conducting control housing body having a sealing seat in the respective valve structure it is possible for the expenditure of force necessary for actuating the valve to be reduced in a simple fashion.

The intermediate housings may for their part possess a uniform connection interface on the side opposite to their connection side. Accordingly such an intermediate housing may readily be inserted, for instance between the main body and a fluid conducting control housing body provided with a sealing seat. Owing to the uniformly designed connection side the same fluid conducting control housing body may however also be directly mounted on the main body.

In accordance with a further convenient modified design the fluid conducting control housing body for its part possesses a uniform connection interface on its side opposite to its connection side for freely selected combination with a drive part or with a pilot valve part. Accordingly the possibilities of variation as regards the make-up of the respective valve are even further increased, while the number of standardized modules is still low.

The main body is preferably produced from a piece of tube by placing same in a pressing mold and deformation thereof using a stamp, the ends of the piece of tube being put in the form of tubular connection ports and the middle piece, arranged between the ends, being thrust inward on one side of the piece of tube, which corresponds to the floor of the valve body, whereas on the opposite side of the piece of tube a flat is formed in the wall of the piece of tube using an opposite face of the pressing mold with the result that opposite to the flat two fluid guiding faces are formed, which starting from the axial direction defined by the connection ports are orientated axially inwardly and at the same time toward the flat, and furthermore converge in a common rib opposite to the flat, and the connection interface is formed in the part, corresponding to the flat, of the deformed wall of the piece of tube opposite to the rib.

Further advantageous developments of the invention are defined in the dependent claims.

The invention will now be explained in more detail on the basis of embodiments and with reference to the drawings.

FIG. 1 shows a diagrammatic longitudinal sectional view of a main body of the fluid conducting valve part of a modular valve structure.

FIG. 2 is a plan view of the main body depicted in FIG. 1.

FIG. 3 is a perspective longitudinal sectional view of a main body provided with a connection flange.

FIGS. 1 through 3 show a first embodiment of a main body forming the fluid conducting valve part of a modular valve structure.

Figure 4:
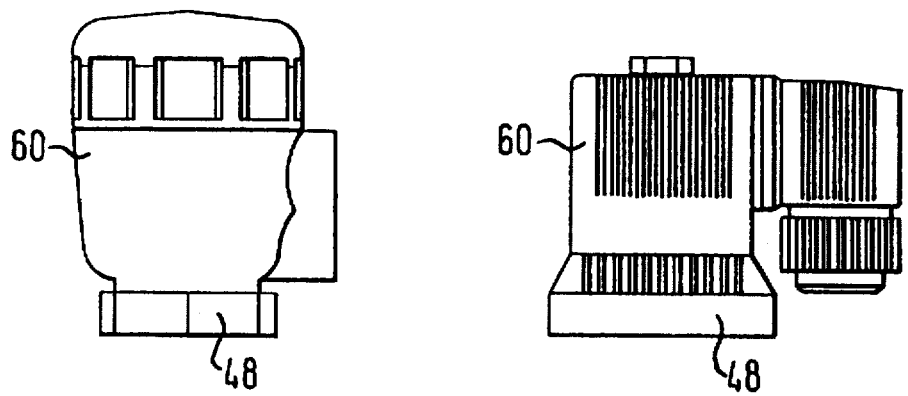
FIG. 4 is a diagrammatic showing of modules, able to be combined together, of a modular valve structure comprising the main body as illustrated in FIGS. 1 through 3.
Figure 4:
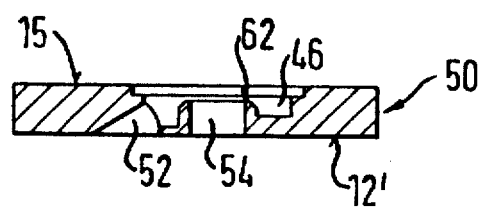
Figure 4:
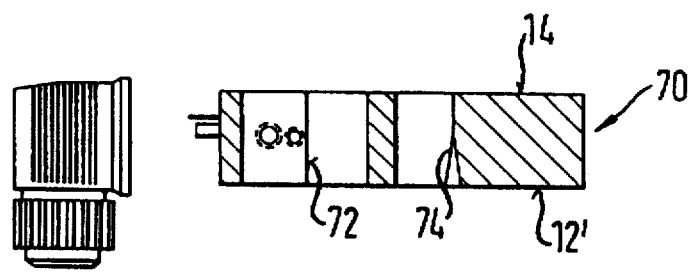
Figure 4:
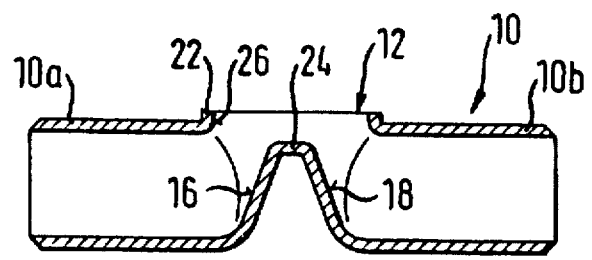

This main body 10 comprising an inlet 10a and an outlet 10b possesses a uniform connection interface 12, at which an inlet duct load, extending from the inlet 10a, and an outlet duct 10b', which leads to the outlet 10b and is separated from the inlet 10a by a rib 24, terminate. In a manner yet to be described, at this uniform connection interface 12 there may be freely selectively connected any one of several valve components which, though they are different, share the feature of having a corresponding uniformly designed connection side.

The main body 10 is formed from a piece of tube by placing same in a pressing mold and by deformation thereof using a pressing stamp. When this occurs the ends of the piece of tube are made into tubular connection ports constituting the inlet 10a and the outlet 10b. The middle section 10c, placed intermediate the ends, is pressed inward on one side of the piece of tube corresponding to the floor of the valve body, whereas on the opposite side of the piece of tube firstly a flat in the wall of the piece of tube is formed by means of an opposite face of the pressing mold with the result that opposite to the flat two fluid guiding faces 16 and 18 are formed, which starting from the axial direction as defined by the connection ports, are orientated axially inward and at the same time toward the flat and converge in the common rib 24 opposite to the flat. The uniform connection interface 12 is formed opposite to the rib 24 in the part corresponding to the flat, of the deformed wall of the piece of tube. For this purpose in the embodiment illustrated in FIGS. 1 and 2 in the flattened portion a wall section in the form of a circular disk is cut out so that of the flat practically only an annular collar 22 remains, which represents the rim of an opening 26 forming the connection interface 12, such opening 26 being circular in plan view (see FIG. 2). This opening 26 renders it possible to the see the rib 24, which, as illustrated in FIG. 2, extends athwart the axis of the piece of tube and at either end smoothly merges with the rim of the opening 26. As may be seen from the perspective view of FIG. 3, the rib 24 is concavely curved, it however having a flat sealing face 24a.

For the completion of the preferably metallic main body 10 a rectangular, tabular connection flange 28, which has an opening corresponding to the external diameter of the annular collar 22, is mounted around the annular collar 22 and is preferably fixed in place by means of weld seams 30.

In FIG. 4 different components for a modular valve structure are illustrated, which comprise the main body 10 of FIGS. 1 through 3, different, freely selectively employed drive parts 60 and furthermore the previously mentioned different valve components (which are able to be utilized in case of need and may be combined) capable of being connected via a uniformly designed connection side 12' with the uniform connection interface 12 of the main body 10.

In FIG. 4, as regards such different valve components, only a fluid conducting control housing body 50, provided with a sealing seat 62, and an intermediate housing 70 for accommodating sensors, are illustrated Basically it is possible for further valve components to be provided of any suitable design while having a uniformly designed connection side. An intermediate housing 70 may more particularly be designed for duct branching, the taking of samples, the inlet of materials or for metering etc, and may be included for this purpose, if necessary.

Either the fluid conducting control housing body 50 or the intermediate housing 70 is able to be selectively connected with the uniform connection interface 12 of the main body 10. For this purpose the two different valve components 50 and 70 are provided with a uniformly designed connection side 12', which is adapted to or matches the uniform connection interface 12 of the main body 10. In the present case the connection sides 12' of the different valve components 50 and 70 possess two uniformly designed connection openings 52, 54 and, respectively, 72, 74. In the case of the tabular fluid conducting control housing body 50 the two connection openings 52 and 54 are constituted by two ducts, the duct defining the connection opening 52 opening into an annular space 46, which is formed between the fluid conducting control housing body 50 and the housing 48 of the respective drive part 60 mounted on the control housing body 50. The annular space 46 surrounds the sealing seat 62 provided in the fluid conducting control housing body 50, into which the other duct opens which forms the connection opening 54.

In the case of the intermediate housing 70 the two connection openings 72 and 74 are formed by two straight-through ducts, in which, for example, sensors are mounted or connection functions can be integrated The intermediate housings 70 for their part have a uniform connection interface 14 on the side opposite to the connection side 12'.

The fluid conducting control housing body 50 is for its part, on the side opposite to its connection side 12', provided with a uniform connection interface 15 for freely selective combination with a drive part 60 or a pilot valve part.

In the case of the components illustrated in FIG. 4 for the modular design of a seat-type valve it is consequently possible for either the intermediate housing 70 to be mounted between the main body 10 and the fluid conducting control housing body 50 or for the fluid conducting control housing body 50 to be directly mounted on the main body 10. On the uniform connection interface 15, facing away from the main body 10, of the fluid conducting control housing body 50 it is possible for either a respective drive part 60 to be directly mounted or in case of need a pilot valve part may be mounted Once the valve has been assembled, the corresponding uniformly designed connection openings 52, 54; 72 and 74 of the respectively employed, different valve components 50 and 70 are aligned with the respective connection ducts, opening at the uniform connection interface 12, of the main body 10, such connection ducts being simultaneously separated from each other by a seal in the rib portion.

Figure 5:
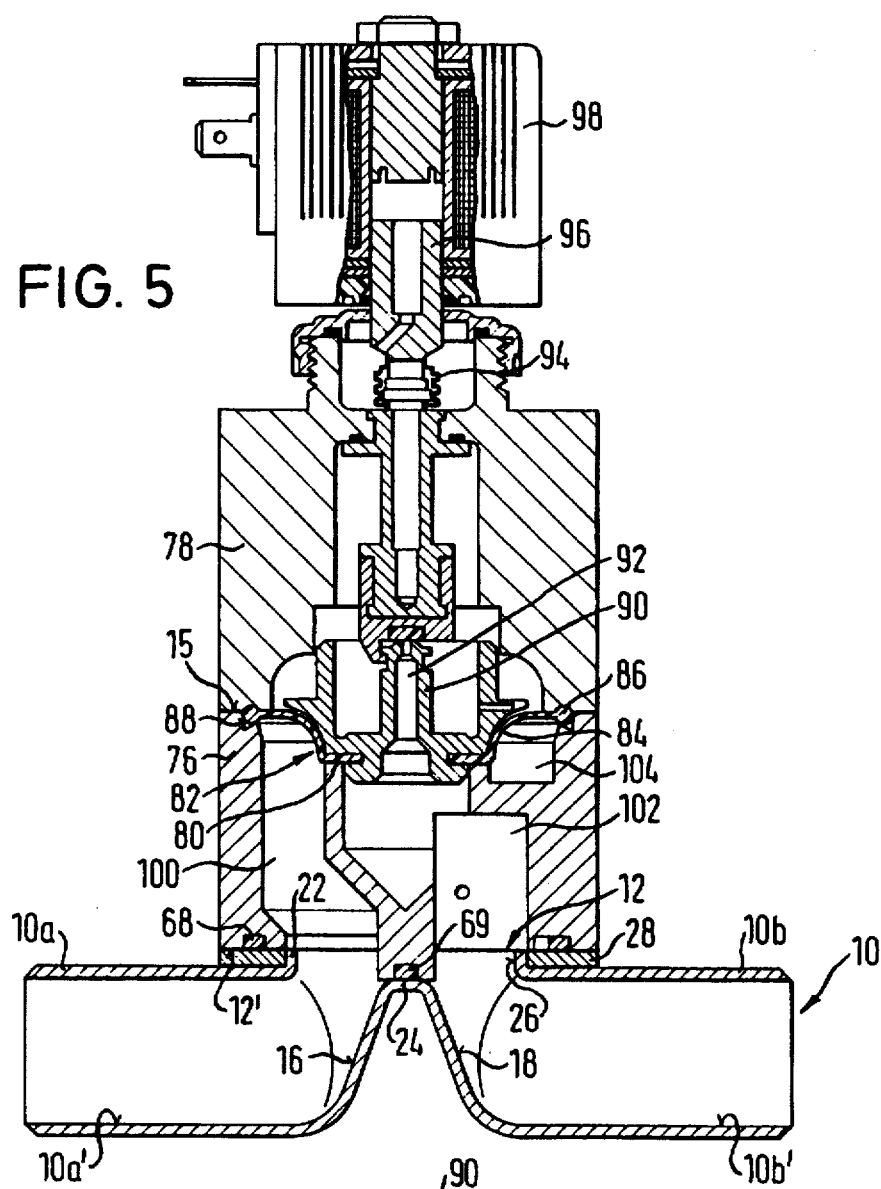
FIG. 5 is a diagrammatic and partially sectioned representation of a servo operated coupled modular seat-type valve, said valve comprising the main body as shown in FIGS. 1 through 3.

FIG. 5 shows the modular design of a servo powered, coupled seat-type valve, in the case of which preferably the main body 10 as depicted in FIGS. 1 through 3, is again utilized.

A fluid conducting control housing body 76 is mounted in engagement with the connection flange 28, opposite to the fluid guiding faces 16 and 18, of the main body 10. The fluid conducting control housing body 76 is provided with two connection ducts 100 and 102, which on the uniform connection side 12 again form two connection openings, which are aligned with connection ducts 10a' and 10b' in the main body 10, such connection ducts being separated from one another by the rib 24 and terminating in the uniform connection interface 12. Owing to a sealing ring 68 there is a sealing action at the annular collar 22, which constitutes the rim of the opening 26 in the uniform connection interface 12 of the main body 10. Owing to a further seal 69 a sealing action is ensured adjacent to the rib 24.

A diaphragm system 82 cooperates with the central cylindrical sealing seat 80 of the fluid conducting control housing body 76, such system being arranged between the fluid conducting control housing body 76 and a pilot valve part 78 mounted to be in engagement with the uniform connection interface 15 thereof facing away from the main body 10. The diaphragm system 82 possesses a central part 90, at whose periphery a diaphragm 84 is clamped in place, such diaphragm 84 possessing at the outer periphery a beaded edge 86 which is received in an annular groove 88 formed between the control housing body 76 and the pilot valve part 78. The central part 90 is provided with an axial hole 92 serving as a pilot duct. The connection duct 100 of the control housing body 76 opens into an annular space 104, which is formed between the diaphragm 84 and the fluid conducting control housing body 76. This annular space 104 surrounds the cylindrical sealing seat 80, into which the other connection duct 100 opens.

The central part 90 of the diaphragm system 82 is coupled via a bellows 94 in the pilot valve part 78 with the core 96 of a magnetic drive part 98 mounted on the pilot valve part 78. Accordingly the illustrated modular valve design constitutes a pilot valve with a magnetic force-driven positive stroke of the diaphragm system 82 cooperating with the sealing seat 80.

In the case of the modular valve structure illustrated in FIG. 5 the fluid conducting control housing body 76 is for this reason connected via the uniformly designed connection side 12' with the uniform connection interface 12 of the main body 10, whereas on its side opposite to the connection side 12' the fluid conducting control housing body 76 again possesses a uniform connection interface 15, in engagement with which in the present case the control valve part 78 is mounted.

Figure 6:
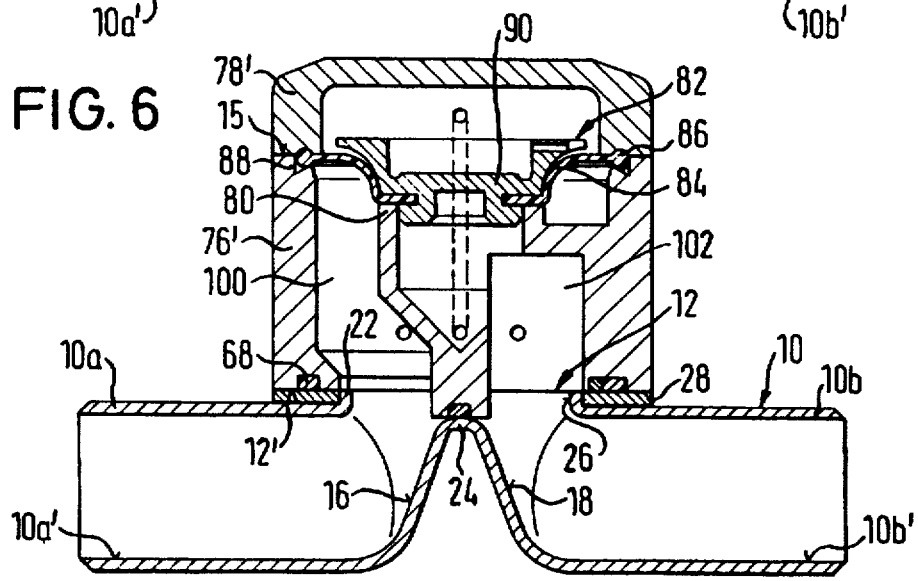
FIG. 6 is a diagrammatic, partially sectioned side view of a servo operated, decoupled modular seat-type valve, said valve comprising the main body as shown in FIGS. 1 through 3.

In FIG. 6 a modular valve structure is represented for forming a servo operated, decoupled seat-type valve.

On the main body 10 there is again mounted a fluid conducting control housing body 76' with a central, cylindrical sealing seat 80 and two connection ducts 100 and 102. The connection of the fluid conducting control housing body 76 having the uniformly designed connection side 12' with the uniform connection interface 12 of the main body 10 and the sealing effect adjacent to the annular collar 22 and the rib 24 are performed in the same manner as in the embodiment of FIG. 5.

However here another pilot valve part 78' is mounted in engagement with the uniform connection interface 15; facing away from the main body 10; of the fluid conducting control housing body 76' such valve part 78' rendering possible pilot operation decoupled from the magnet armature.

The diaphragm system 82 is arranged in the same fashion as in the embodiment of FIG. 5 between the fluid conducting control housing body 76' and the pilot valve part 78' mounted in engagement with the uniform connection interface 15 thereof. However in a manner different to the previously mentioned design this diaphragm system 82 is now not directly coupled with the magnet armature.

In this design as shown in FIG. 6 of a servo operated, decoupled seat-type valve it is possible therefore for the same main body 10 to be utilized as in the embodiment as shown in FIG. 5, the fluid conducting control housing body 76' being directly connected with the uniform connection interface 12 thereof, such control housing body 76' again possessing a corresponding uniformly designed connection side 12', which in the present case comprises two connection openings formed by the connection ducts 100 and 102, which are uniformly designed with those of the other valve components, which in other respects are different in design. The fluid conducting control housing body 76' for its part again possesses, on the side opposite to its connection side 12', a uniform connection interface 15 in order to be able to combine this fluid conducting control housing body 76' freely selectively with a pilot valve part or a drive part, in the present case with the pilot valve part 78'.

Figure 7:
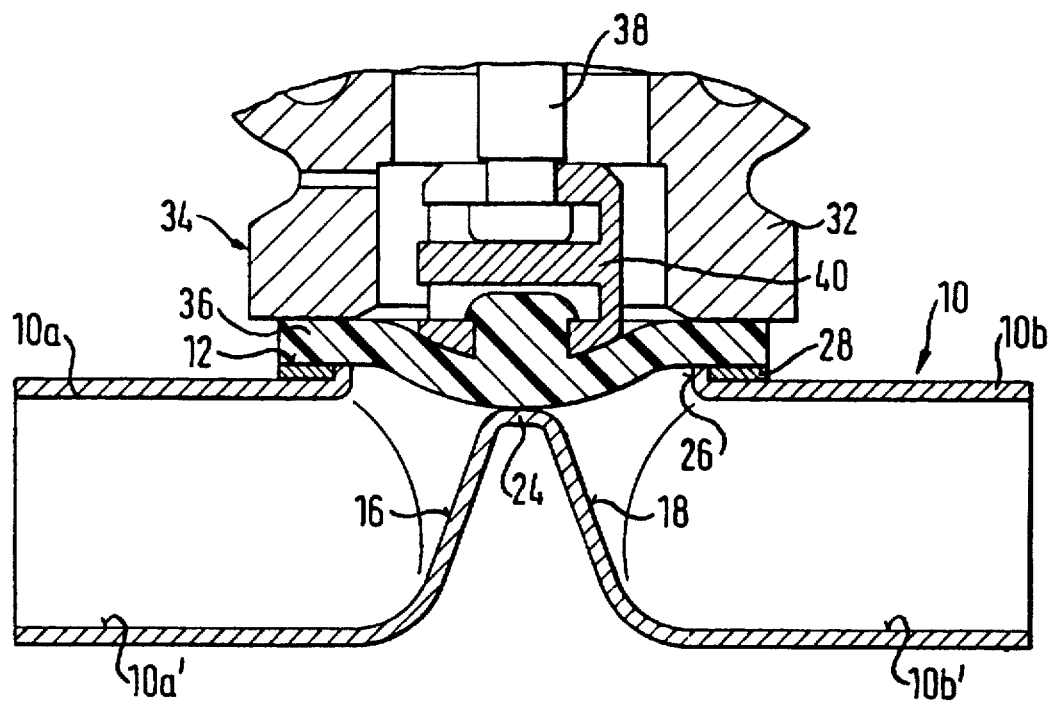
FIG. 7 is an axial section taken through a straight-way diaphragm valve produced using the main body of FIGS. 1 through 3.

Furthermore the main body 10 as shown in FIGS. 1 through 3 is suitable more particularly as part of a straight-way diaphragm valve of the type depicted in FIG. 7. In this case between the connection flange 28 and the housing 32 of a conventional drive part 34 (which is only illustrated in part) a diaphragm 36 is clamped, which is engaged by the actuating plunger 38 of the drive part 34 acting via a coupling part 40. In the case of the closed condition illustrated in FIG. 7 the diaphragm 36 is held in sealing engagement with the rib 24. In this state the drive part 34 is activated, it being pressed upon by spring force. If the drive part 34 is pneumatically activated, the diaphragm 36 will be moved clear of the rib 14. The valve is then in its opened position.

A straight-way diaphragm valve of this type is also suited for use with contaminated media, although it does however require a high drive power. The latter is substantially less in the case of seat-type valves as can be constructed using the valve structure of the invention without any difficulty, a further reduction being rendered possible by the use of pilot valves. Owing to the modular valve structure of the invention the freely selective use of such pilot valve is also possible without any difficulty.

Figure 8:
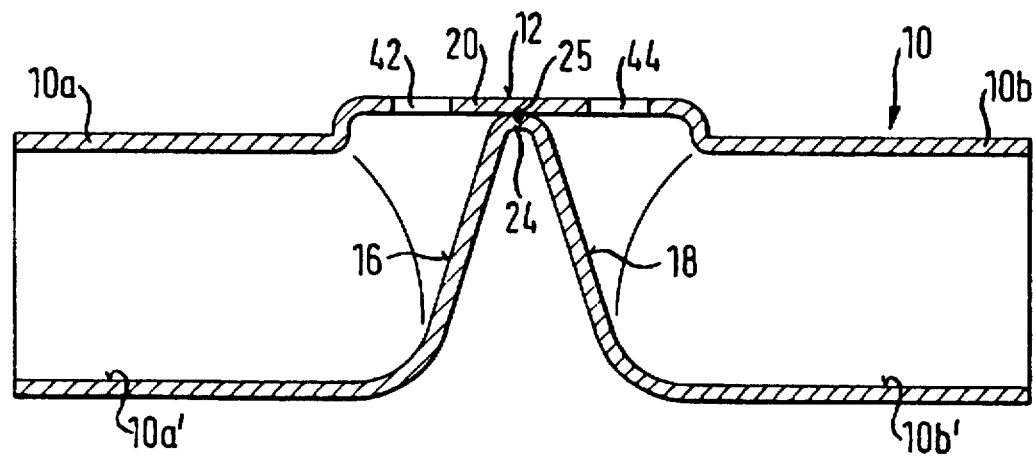
FIG. 8 is a diagrammatic longitudinal sectional view of another embodiment of the main body.

FIG. 8 shows a further embodiment of the main body 10, which again is more particularly suitable for designs of seat-type valves. Corresponding parts are denoted using the same reference numerals as in the previous embodiment. Departing from the embodiment illustrated in FIGS. 1 through 3 in the case of the main body 10 depicted in FIG. 8 the rib 24 is pressed inward as far as the inner side of the flat 20, where it is soldered or welded for sealing at 25. In the flat 20 two apertures 42 and 44 are provided arranged at a distance from each other, by which the uniform connection interface 12 of this main body 10 is formed.

FIGS. 9 through 13 show possible variations in the modular valve structure of the invention for the design of a seat-type valve, the main body 10 as used slightly differing from the design depicted in FIG. 8.

Just like the design of FIG. 8, the main body 10 of the last-named valve modification embodying the modular valve structure of the invention possesses a wall part which is pressed in as far as to abuttingly engage the opposite flat 20 and is welded or soldered with the flat 20 for sealing. Again two separate apertures 42 and 44 are arranged in the flat 20 for forming the uniform connection interface 12, such apertures being also oval if desired. The fluid guiding face 16 however extends at a somewhat steeper angle than in the previously described embodiment. Furthermore, the fluid guiding face 18 is slightly modified, it now starting at the connection port 10b with a steep section, then reaching a point of inflection followed by a flat section and then having a portion with a steep slope again.

Figure 9:
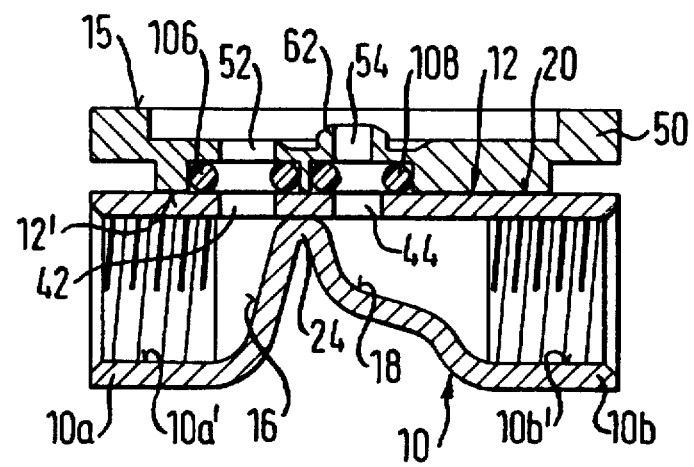
FIG. 9 is a diagrammatic sectional view of a main body of the same type as illustrated in FIG. 8 having fluid guiding faces differing from those of FIG. 8, with which a fluid conducting control housing body is engaged with a sealing seat.

In the case of the modification of a modular valve structure illustrated in FIG. 9, a rectangular, tabular fluid conducting control housing body 50 is engaged with the flat 20 of the main body 10, such flat 20 being opposite to the fluid guiding faces 16 and 18 and constituting a connection flange. The main body 10 is provided with two ducts 52 and 54, which are aligned with the apertures 42 and 44 forming the uniform connection interface 12 of the main body 10. Whereas the apertures 42 and 44 of the main body 10 define the uniform connection interface 12, the ducts 52 and 54 of the fluid conducting control housing body 50, which again has a sealing seat 62, set the positions of the connection openings thereof provided on the uniformly designed connection side 12', such connection openings being designed uniformly with those of other valve components, which in other respects can be different in design. The ducts 52 and 54 are respectively surrounded by a sealing ring 106 and 108.

While the fluid conducting control housing body 50 has its uniform connection side 12' engaged with the corresponding connection interface 12 of the main body 10, on the opposite side it again possesses a uniform connection interface 15, via which it may in case of need be combined with, more especially, a pneumatic or electric drive part or with a pilot valve part.

Figure 10:
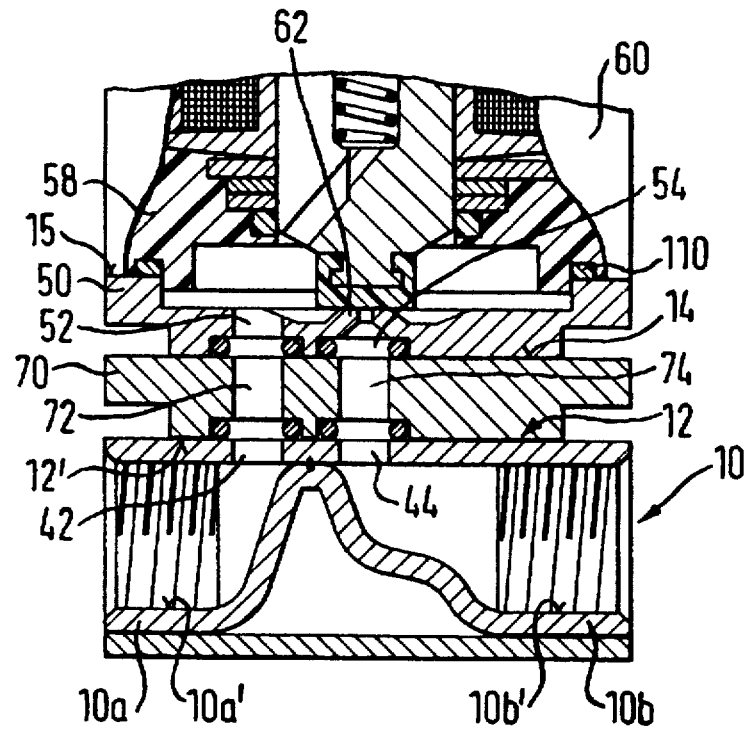
FIG. 10 is a representation similar to that of FIG. 9D in the case of which however between the main body and the fluid conducting control housing body an intermediate housing is placed and a drive part is in engagement with the fluid conducting control housing body for the formation of a seat-type valve.
Figure 11:
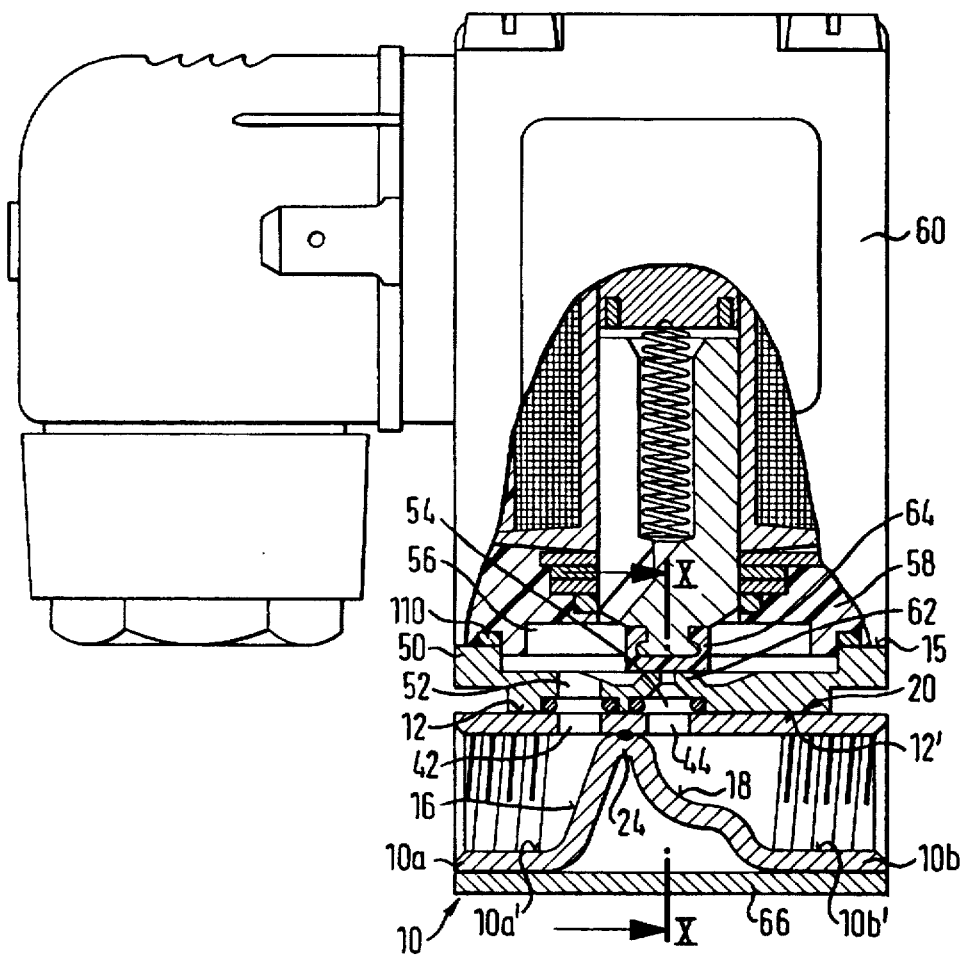
FIG. 11 is a showing, comparable with that of FIG. 10, of a seat-type valve, the intermediate housing being however omitted.
Figure 12:
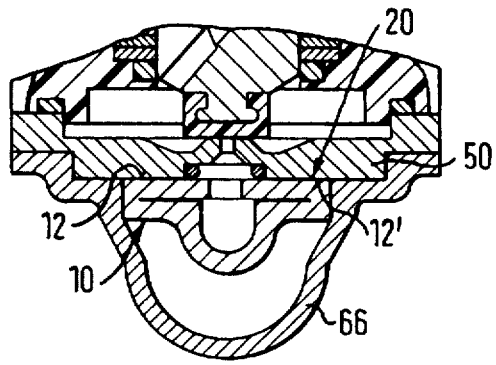
FIG. 12 is a section taken on the line X—X of FIG. 11.

In accordance with FIG. 11 (see also FIG. 10) the connection flange 58 of a magnetic drive part 60 is engaged with this uniform connection interface 15 of the fluid conducting control housing body 50, the sealing action being provided for by an intermediately placed sealing ring 110. The control housing body 50 is in this case slightly different to that of the embodiment in accordance with FIG. 9. Thus, more particularly the duct 54 is designed with a taper.

In the seat-type valve as illustrated in FIG. 11 and embodying the modular valve structure of the invention, the duct 52 of the fluid conducting control housing body 50 having the sealing seat 62 opens into an annular space 56, which is formed between the tabular fluid conducting control housing body 50 and the connection flange 58 of the drive part 60 which is engaged with the connection interface 15 of the control housing body 50. The annular space 56 surrounds the sealing seat 62, into which the tapering duct 54 opens. A closing member 64, actuated by the magnetic drive part 60, cooperates with the sealing seat 62.

Figure 13:
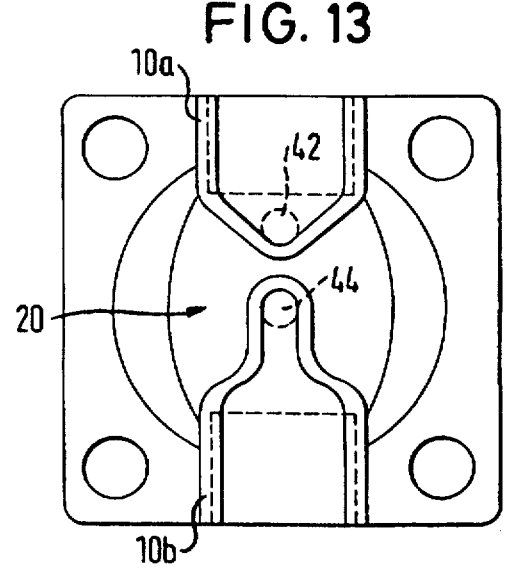
FIG. 13 is a plan view of the floor of the main body.

The entire main body 10 is surrounded by a casing or holding means 66, which also covers over the fluid conducting control housing body 50. This part can therefore more particularly also serve for the attachment of the fluid conducting control housing body 50 on the main body 10, as is illustrated more especially in FIG. 12, which represents a section taken along the line X—X in FIG. 10. FIG. 13 shows the valve arrangement of FIG. 11 as seen from below.

In the case of the modified design depicted in FIG. 10 a tabular intermediate housing 70 is attached between the tabular fluid conducting control housing body 50 and the main body 10, which are designed in the same way as in the previously described embodiment This intermediate housing 70 is provided with two through ducts 72 and 74, which are aligned with the apertures 42 and 44 in the main body 10 and are joined with the ducts 52 and 54 in the fluid conducting control housing body 50 having the sealing seat 62.

As already explained in connection with FIG. 4, such an intermediate housing 70 opens up the possibility of accommodating sensors, duct branching means and means for taking samples, adding material, metering and the like. In the case of the sensors it may for example be a question of sensors for pressure, flow rate and/or temperature.

The intermediate housing 70 again possesses a connection side 12', which is designed uniformly with that of other valve components and via which the intermediate housing 70 can be connected with the uniform connection interface 12 of the main body 10. This connection side 12' of the intermediate housing 70 is accordingly more particularly uniform with that of the fluid conducting control housing body 50 having the sealing seat 62. Accordingly if required the intermediate housing 70 may also be omitted and the fluid conducting control housing body 50 may, as in the case of FIGS. 9, 11 and 12, be connected directly with the uniform connection interface 12 of the main body 10 via its uniform connection side 12'.

Owing to the modular valve design of the invention it is more especially also possible to install and remove the intermediate housing 70 and the control housing body provided with a sealing seat without it being necessary for this purpose for the main body 10 to be disconnected from any pipe system. On the other hand the sealing seat of conventional forms of valve is formed inside the valve body so that for example for the installation or removal of sensors or the like the valve body regularly has to be disconnected or removed from the pipe system.

The connection of the valve with the respective pipe system may for example be in the form of a screw threaded, adhesive, welded or sleeve connection As a valve drive it is more particularly possible to provide pneumatic, electric motor, directly acting or also simple, hand operated drive parts.

Although the main body is preferably fashioned of a metallic material such as more particularly stainless steel or brass, it may, as a matter of principle, also be manufactured of plastic Although the rib of the main body is preferably produced by shaping a suitable piece of tube it is also basically possible for a disk to be fitted into a piece of pipe as a rib, the rib in this case conveniently being connected by welding with the tube housing.

I claim:

1. A modular valve structure comprising a fluid conducting valve part, a drive part and a plurality of different valve components, said fluid conducting valve part comprising a main body with an inlet and an outlet, an inlet duct extending from said inlet and an outlet duct leading to said outlet, and a connection face of a predetermined first configuration, wherein said inlet duct and said outlet duct terminate at said connection interface and are separated from each other by a rib, and each of said valve components is provided with a connection face of a predetermined second configuration, said first and second configurations matching each other permitting each of said valve components to be selectively and interchangeably connected to said fluid conducting valve part.

2. The valve structure as claimed in claim 1, wherein said connection faces of said different valve components respectively comprise at least one connection opening mutually of the same configuration.

3. The valve structure as claimed in claim 1, wherein said different valve components comprise:

directly operable valve elements, which make sealing engagement with a rim of an opening forming said connection interface and with said rib;

fluid conducting control housing bodies wherein a valve chamber is formed with a sealing seat;

intermediate housings for accommodating sensors; and intermediate housings for duct branching, sample taking, inlet of materials or metering.

4. The valve structure as claimed in claim 3, wherein said intermediate housings also comprise a uniform connection interface on the side opposite to their connection side.

5. The valve structure as claimed in claim 3, wherein said fluid conducting control housing body also comprises a uniform connection interface on the side opposite to its connection side for selectively combining said fluid conducting control housing body with a drive part or a pilot valve part.

6. The valve structure as claimed in claim 1, wherein at least one of said valve components is of modular design.

7. The valve structure as claimed in claim 1, wherein said main body is formed of a cylindrical piece of a tube having two ends by filling said piece of a tube with a filling material, closing said ends with sealing plugs, inserting said piece of a tube into a pressing mold and deforming said piece of a tube in a single step using a stamp which acts athwart the axis of said piece of tube from the outside and which in the interior of said piece of a tube produces the pressure necessary for deforming said piece of a tube, such pressure being transmitted to the inner wall face of said piece of a tube by said filling material, wherein said ends of said piece of a tube remain in the form of tubular connection ports and a middle section between said ends is pressed inward on one side of said piece of a tube which corresponds to the floor of the valve body by forming a concave curvature, whereas on the opposite side of said piece of a tube a flat in said wall of said piece of a tube is formed by an opposing face of the pressing mold, so that opposite to said flat two fluid guiding faces are formed which start from axial direction as defined by the connection ports and are orientated axially inward and toward said flat simultaneously, and which also converge together in a common rib opposite to said flat, and after removal of said filling material said connection interface is formed in the part corresponding to said flat of the deformed wall of said piece of a tube opposite to the rib.

8. The valve structure as claimed in claim 7, wherein said main body comprises a metallic material.

9. The valve structure as claimed in claim 1, wherein said main body comprises a connection flange, in which said connection interface is formed.

* * * * *